United States Patent [19]

Sussman

[11] Patent Number: 5,878,152
[45] Date of Patent: Mar. 2, 1999

[54] DEPTH FROM FOCAL GRADIENT ANALYSIS USING OBJECT TEXTURE REMOVAL BY ALBEDO NORMALIZATION

[75] Inventor: Michael Sussman, Winchester, Mass.

[73] Assignee: Cognex Corporation, Natick, Mass.

[21] Appl. No.: 859,854

[22] Filed: May 21, 1997

[51] Int. Cl.[6] ............................... G06K 9/00; G06K 9/36
[52] U.S. Cl. .......................... 382/106; 382/108; 382/141; 382/255
[58] Field of Search ..................................... 382/106, 108, 382/141, 255, 254, 144, 146, 147, 149, 150; 348/128, 131, 135; 345/429, 430

[56] References Cited

U.S. PATENT DOCUMENTS

| 4,472,056 | 9/1984 | Nakagawa et al. | 356/376 |
|---|---|---|---|
| 4,581,762 | 4/1986 | Lapidus et al. | 382/141 |
| 4,640,620 | 2/1987 | Schmidt | 356/376 |
| 4,689,480 | 8/1987 | Stern | 250/201 |
| 4,876,455 | 10/1989 | Sanderson et al. | 250/560 |
| 4,893,183 | 1/1990 | Nayar | 358/107 |
| 4,912,336 | 3/1990 | Nayar et al. | 250/560 |
| 4,948,258 | 8/1990 | Caimi | 356/376 |
| 4,965,442 | 10/1990 | Girod et al. | 382/106 |
| 4,984,893 | 1/1991 | Lange | 356/376 |

(List continued on next page.)

FOREIGN PATENT DOCUMENTS

| 0 183 240 A2 | 6/1986 | European Pat. Off. . |
|---|---|---|
| 0 300 164 A1 | 1/1989 | European Pat. Off. . |
| 0 563 829 A2 | 10/1993 | European Pat. Off. . |
| 0 627 610 A1 | 12/1994 | European Pat. Off. . |
| 3413605 A1 | 10/1985 | Germany . |
| 3-63507 | 8/1989 | Japan . |
| 9-26312 | 8/1989 | Japan . |
| 4-283608 | 3/1991 | Japan . |
| 4-313008 | 4/1991 | Japan . |
| 6-249632 | 2/1993 | Japan . |

(List continued on next page.)

OTHER PUBLICATIONS

A. Pentland, S. Scherock, T. Darrell, and B. Girod. "Simple range cameras based on focal error," J. Opt. Soc. Am. A., vol. 11, No. 11, Nov. 1994, pp. 2925–2934.

B. Girod, and S. Scherock "Depth from Defocus of Structured Light," SPIE vol. 1194 Optics, Illumination, and Image Sensing for Machine Vision IV (1989), pp. 209–215.

P. Caber, "Interferometric profiler for rough surfaces," Applied Optics, vol. 32, No. 19, 1 Jul. 1993, pp. 3438–3441.

S. Nayar and Y. Nakagawa, "Shape from Focus," IEEE Transactions on Pattern Analysis and Machine Intelligence, vol. 16, No. 8, Aug. 1994, pp. 824–830.

(List continued on next page.)

*Primary Examiner*—Scott Rogers
*Attorney, Agent, or Firm*—Russ Weinzimmer

[57] ABSTRACT

The invention provides a method and apparatus for obtaining a range image of an object. The method includes the act of "albedo normalization", i.e., removing the effects of object reflectance using a structured illumination image of the object and a uniform illumination image of the object to provide an albedo-normalized image. This image is then processed using a focus measure to provide a focal image, which image is then used to provide a range image. The invention substantially removes the effects of object reflectance from an image acquired using structured illumination, so that only the structured illumination pattern and its degree of focus/defocus remains. Albedo normalization is achieved by dividing an image of an object taken under structured illumination by a corresponding image of the object taken under uniform illumination. The albedo normalization act removes the primary source of noise in range images obtained using a depth from defocus or depth from focus of structured illumination technique, by removing spurious image frequencies from the image before processing by a focus measure. The albedo normalization act permits the depth from defocus and depth from focus techniques to be used for one or more focal positions, and over a broad range of materials of interest in machine vision.

21 Claims, 15 Drawing Sheets

U.S. PATENT DOCUMENTS

| | | | |
|---|---|---|---|
| 4,988,202 | 1/1991 | Nayar et al. | 356/394 |
| 5,003,166 | 3/1991 | Girod | 382/106 |
| 5,151,609 | 9/1992 | Nakagawa et al. | 250/561 |
| 5,239,178 | 8/1993 | Derndinger et al. | 250/234 |
| 5,248,876 | 9/1993 | Kerstens et al. | 250/561 |
| 5,424,835 | 6/1995 | Cosnard et al. | 356/376 |
| 5,546,189 | 8/1996 | Svetkoff et al. | 356/376 |
| 5,589,942 | 12/1996 | Gordon | 356/376 |
| 5,617,209 | 4/1997 | Svetkoff et al. | 356/376 |
| 5,659,420 | 8/1997 | Wakai et al. | 359/368 |

FOREIGN PATENT DOCUMENTS

| | | |
|---|---|---|
| 7-311025 | 5/1994 | Japan . |
| 8-233544 | 2/1995 | Japan . |
| 9-50456 | 6/1995 | Japan . |
| 8-152308 | 9/1995 | Japan . |
| 8-304043 | 9/1995 | Japan . |
| 9-96512 | 9/1995 | Japan . |
| 9-127420 | 11/1995 | Japan . |
| WO 96/41304 | 12/1996 | WIPO . |

OTHER PUBLICATIONS

Y. Xiong and S. Shafer, "Depth from Focusing and Defocusing," Proc. IEEE Conference on Computer Vision and Pattern Recognition 1993, pp. 68–73.

J. Wyant, "How to extend interferometry for rough surface tests," Laser Focus World, Sep. 1993, pp. 131–133.

J.-A. Beraldin, M. Rioux, F. Blais, and R. A. Couvillon, "Digital Three–dimensional Imaging in the Infrared at the National Research Council of Canada," SPIE vol. 2269 Infrared Technology XX (1994), pp. 208–225.

Z.J. Geng, "Rainbow three–dimensional camera: new concept of high–speed three–dimensional vision systems," Optical Engineering, vol. 35 No. 2, Feb. 1996, pp. 376–383.

M. Watanabe and S. Nayar, "Telecentric Optics for Constant–Magnification Imaging," Technical Report CUCS–026–95, Dept. of Computer Science, Columbia University, New York, NY, USA, Sep. 1995.

M. Watanabe, S. Nayar, and M. Noguchi, "Active Focus Range Sensor," Implementation Technical Note, Dept. of Computer Science, Columbia University, New York, NU, USA, Jun. 1995.

M. Watanabe, S. Nayar, and M. Noguchi, "Real–time computation of depth from defocus," Proc. of SPIE v 2599, 1996, pp. 14–25.

S. Nayar, M. Watanabe, and M. Noguchi, "Real–Time Focus Range Sensor," IEEE Transactions on Pattern Analysis and Machine Intelligence, vol. 18, No. 12, Dec. 1996, pp. 1186–1198.

M. Noguchi and S. Nayar, Microscopic Shape from Focus Using Active Illumination, Proc. IEEE Conference on Computer Vision and Image Processing 1994, pp. 147–152.

M. Subbarao and G. Surya, "Depth from Defocus: A Spatial Domain Approach," International Journal of Computer Vision, 13, 3, 1994, pp. 271–294.

R. Stone and S. Shafer, "Surface Roughness Estimation," The Robotics Institute, Carnegie Mellon University, Pittsburgh, PA, USA,.

A. Pentland, "A New Sense for Depth of Field," IEEE Transactions on Pattern Analysis and Machine Intelligence, vol. PAMI–9, No. 4, Jul. 1987, pp. 523–531.

M. Ishihara and H. Sasaki, "High Speed 3–D Shape Measuring Apparatus using Shape from Focus Method," Seimitsu Kogaku Kaishi (Precision Engineering Journal), vol. 63, No. 1, 1997, pp. 124–128.

"Confocal Microscopy," Optical Instruments, pp. 17.40–17.43.

R. Webb, "Confocal Microscopes," Optics & Photonics News Jul. 1991, pp. 8–13.

R. Schneider, A. Schick, P. Kollensperger, and T. Ninomiya, "High–speed optical three–dimensional scanner for automatic solder joint inspection," Optical Engineering, vol. 36, No. 10, Oct. 1997, pp. 2878–2885.

M. Ishihara, "High speed 3–D Shape Measurement for a Small Object," Dai Ni–kai Gazou Senshing Shinpojiumu Kouen Ronbunshuu (Collection of the Lectures at the 2nd Image Sensing Symposium), Jun. 1996, pp. 155–158.

M. Ishihara and H. Sasaki, "High Speed 3–D Shape Measurement Using Non–Scanning Multibeam Confocal Lens System," Dai San–kai Gazou Senshing Shinpojiumu Kouen Ronbunshuu (Collection of the Lectures at the 3rd Image Sensing Symposium).

T. Yamashita and H. Nakashima; M. Nagashima and K. Nishiuchi, "Measuring longitudinal displacements using laser beam diffraction changes near the focal point," Rev. Sci. Instrum., vol. 64, No. 8, Aug. 1993, pp. 2245–2249.

Patent Abstracts of Japan, vol. 8, No. 6 (P–247) '1443! , 12 Jan. 1984 & JP 58 169008 A (Nippon Denki K.K.), 5 Oct. 1983.

| 4.2 | 0 | -6.4 | 0 | 6.4 | 0 | -4.2 |
|-----|---|------|---|-----|---|------|
| 0 | 0 | 0 | 0 | 0 | 0 | 0 |
| -6.4 | 0 | 10 | 0 | -10 | 0 | 6.4 |
| 0 | 0 | 0 | 0 | 0 | 0 | 0 |
| 6.4 | 0 | -10 | 0 | 10 | 0 | -6.4 |
| 0 | 0 | 0 | 0 | 0 | 0 | 0 |
| -4.2 | 0 | 6.4 | 0 | -6.4 | 0 | 4.2 |

DEPTH FROM FOCAL GRADIENT ANALYSIS USING OBJECT TEXTURE REMOVAL BY ALBEDO NORMALIZATION

FIELD OF THE INVENTION

This invention relates generally to machine vision, and particularly to machine vision systems having a capacity to provide range images of objects using the extent of focus/defocus of patterns superimposed by structured lighting.

BACKGROUND OF THE INVENTION

Range sensing has important industrial applications. Examples of processes which benefit greatly from the use of range imagery include: the measurement of solder paste volume in manufacture of surface-mounted electronic assemblies; digitization of the geometry of three-dimensional clay models; and inspection of semiconductor packages for lead coplanarity.

Stereo vision, triangulation, time-of-flight, and structured lighting methods are all used to obtain depth images. All of these methods require computational overhead which constrains the rate at which dense depth images can be produced. Another class of depth imaging techniques relies on the focus information present in camera images due to the depth of field constraints of optical systems. Depth from focus methods employ a search for the focal position yielding best camera focus on a point-by-point basis. A focus measure, usually a form of high pass filter, is used to determine the focus maxima, as described in Subbaro, M. and Gopal, S., Depth from Defocus: A Spatial Domain Approach, International Journal of Computer Vision, 13, 3, 271–294, 1994, incorporated herein by reference. Depth in the observed scene can be determined from focal position using basic lens equations. The technique benefits from the fact that all spatial frequencies present in an image attain peak amplitude at best focus. Depth from focus suffers from the drawback that many images need to be taken to locate the focal maxima with sufficient accuracy.

Pentland, in "A New Sense For Depth of Field", IEEE Transactions on Pattern Analysis and Machine Intelligence, Vol. 9, No. 4, pp. 523–531, July 1987, incorporated herein by reference, demonstrated the use of focal gradient information to derive depth images from one or two images of a scene, without requiring a more exhaustive search for point-by-point maxima. This technique has become known as depth from defocus. In passive depth from defocus, the high frequency information naturally present in a scene is analyzed to determine focal position. However, this natural object texture is lacking when viewing smooth objects. Pentland and Girod suggested the use of structured illumination to circumvent this problem, in A. Pentland, S. Scherock, T. Darrell, and B. Girod, Simple Range Cameras Based on Focal Error, J. Optical Society of America, vol. 11, no. 11, pp. 2925–2935, November 1994, and B. Girod and S. Scherock, Depth from Focus of Structured Light, Proc. SPIE: Optics, Illum., and Image Sng for Mach Vis. IV, vol. 1194, November 1989, Philadelphia, Pa. herein incorporated by reference. A fine two-dimensional light pattern is used to (actively) illuminate the object, creating artificial texture. Defocus of the superimposed illumination pattern conveys range information.

Note that the term texture is used here to describe variations in reflectance seen in two dimensional images. This texture may or may not be due to actual surface relief.

An important simplification results from the use of active illumination in depth from defocus. Many different spatial frequencies are present in natural scenes. These different signal components are attenuated differently by defocus. Deriving a focus measure which is invariant to spatial frequency has thus been difficult. Nayer et. al recognized that imposition of structured illumination permits control over the spectral content of images., as described in S. Nayer, M. Watanabe, M. Noguchi, Real-time Focus Range Sensor, IEEE Transaction on Pattern Analysis and Machine Intelligence, Vol. 18, No. 12, pp. 1186–1198, December 1996, herein incorporated by reference. An active illumination pattern was developed in conjunction with a narrow band tuned focus measure. The resulting range sensor was demonstrated to produce range images of good quality in real-time, made possible by the computational simplification of the focus measure.

In active depth from defocus using a tuned focus measure, it is necessary that the projected structured illumination dominate the texture observed in the object. Natural object texture present within the passband of the tuned operator is not rejected. Furthermore, very high contrast regions in the reflectance image, such as reflections from the tops of solder balls on integrated circuit packages, can induce Gibbs ringing in the narrow-band tuned focus measure. These effects create noise and artifacts in the range images. Real objects of interest in machine vision applications contain mixtures of materials with different spatial frequency content and amplitude of natural texture. Also, at the scale of semiconductor packaging, translucency of surfaces blurs the projected pattern and greatly reduces it's contrast. Thus, we find that projected texture does not always dominate observed texture, as required.

SUMMARY OF THE INVENTION

The method and apparatus of the invention substantially remove the effects of object reflectance from an image acquired using structured illumination, so that only the structured illumination pattern and its degree of focus/defocus remains. Removing the effects of object reflectance (the removing called "albedo normalization") is achieved by dividing an image of an object taken under structured illumination by a corresponding image of the object taken under uniform illumination. The albedo normalization act removes the primary source of noise in range images obtained using a depth from defocus or depth from focus of structured illumination technique, by removing spurious image frequencies from the image before processing by a focus measure. The albedo normalization act permits the depth from defocus and depth from focus techniques to be used for one or more focal positions, over a broad range of materials of interest in machine vision.

In one general aspect, the invention is a method for providing a range image of an object, where the method includes the acts of acquiring a structured illumination image of the object; acquiring a uniform illumination image of the object; performing albedo normalization using the structured illumination image of the object and the uniform illumination image of the object to provide an albedo-normalized image; processing the albedo-normalized image using a focus measure to provide a focal image; and using the focal image to provide a range image.

In a preferred embodiments, the act of processing the albedo-normalized image using a focus measure to provide a focal image includes the act of using an RMS operation, and the act of processing the albedo-normalized image using a focus measure to provide a focal image includes the act of using a Laplacian-like convolution. In further preferred embodiments, the act of using the focal image to provide a range image includes the act of using a table look-up calibration employing a look-up table, and the act of using a table look-up calibration includes the acts of collecting focus measure data at known Z-positions, and inverting a look-up table using interpolation. In another important preferred embodiment, the act of performing albedo normalization is achieved by dividing the structured illumination image of the object by the uniform illumination image of the object.

Another general aspect of the invention is an apparatus for providing a range image of an object, where the apparatus includes structured illumination image acquisition means for acquiring a structured illumination image of the object and uniform illumination image acquisition means for acquiring a uniform illumination image of the object. The apparatus also includes an albedo-normalization means that is connected to the structured illumination image acquisition means and the uniform illumination image acquisition means. The albedo-normalization uses the structured illumination image of the object and the uniform illumination image of the object to perform albedo normalization so as to provide an albedo-normalized image. Further, processing means, connected to the albedo-normalization means, processes the albedo-normalized image using a focus measure to provide a focal image that conveys relative range information. In addition, calibration means can be included as well, connected to the processing means, for using the focal image to provide an absolute range image.

Another general aspect of the invention is a method for providing a range image of an object that involves two focal images, where the method includes the acts of: acquiring a first structured illumination image of the object at a first focal position; acquiring a first uniform illumination image of the object at the first focal position; using the first structured illumination image of the object and the first uniform illumination image of the object, performing albedo normalization to provide a first albedo-normalized image; processing the first albedo-normalized image using a focus measure to provide a first focal image; and using the first focal image and a second focal image acquired at a second focal position for performing range normalization to provide a relative normalized range image. In a preferred embodiment, this method further includes the act of calibration to obtain an absolute normalized range image from the relative normalized range image.

BRIEF DESCRIPTION OF THE DRAWINGS

The invention will be more fully understood from the following detailed description, in conjunction with the accompanying figures, wherein:

FIG. 11B is an alternate filter kernal with zeros inserted to provide phase independent alignment

DETAILED DESCRIPTION OF THE DRAWINGS

Figure 1:
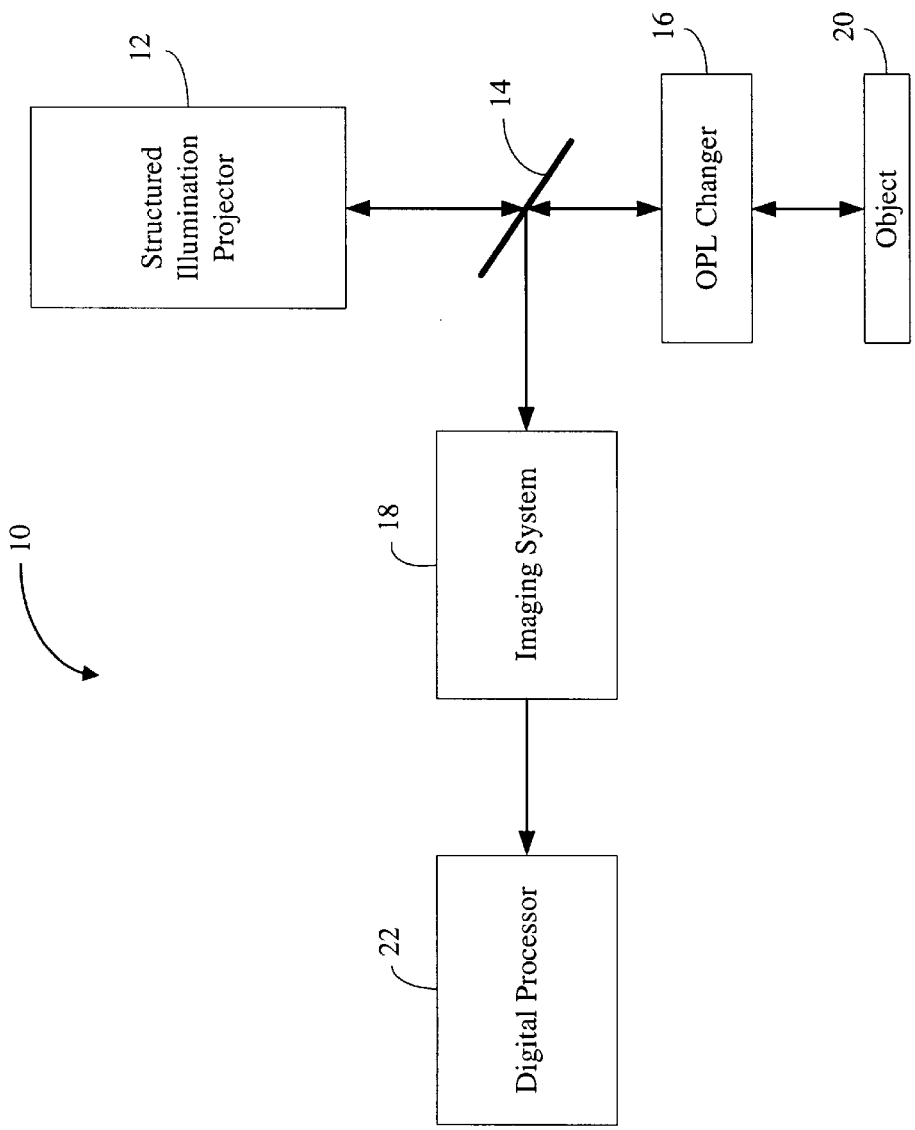
FIG. 1 is a schematic view of a system configuration of a depth from defocus range sensor.

FIG. 1 depicts an overall system configuration of a depth from defocus sensor 10. The system 10 includes a structured illumination projector 12, a beam splitter 14, a module 16 for changing optical path length so as to change the focal distance from the projector 12 and from an imaging system 18 to an object 20 to be sensed, and a digital processor 22. The structured illumination projector 12 serves to superimpose a bright pattern of known spatial frequency on the object 20 being measured, to permit rapid and accurate evaluation of degree of defocus. The bright pattern can be created by shining light through a periodic patterned mask (not shown), as is known in the art. The projector 12 also includes means for either shifting the patterned mask or removing illumination structure entirely, as described in detail in co-pending U.S. patent application Ser. No. 08/777, 107, herein incorporated by reference. Removing illumination structure entirely permits acquisition of reference images for the purpose of albedo normalization, as described in detail below.

The beam splitter 14 allows the imaging system 18 to view the object 20 using the same optical path as the illuminator 12. Such preferred coaxial illumination and imaging, arranged normal to the object 20, ensures that object relief does not result in shadow areas, thereby overcoming some of the limitations of triangulation-based sensors.

Figure 1A:
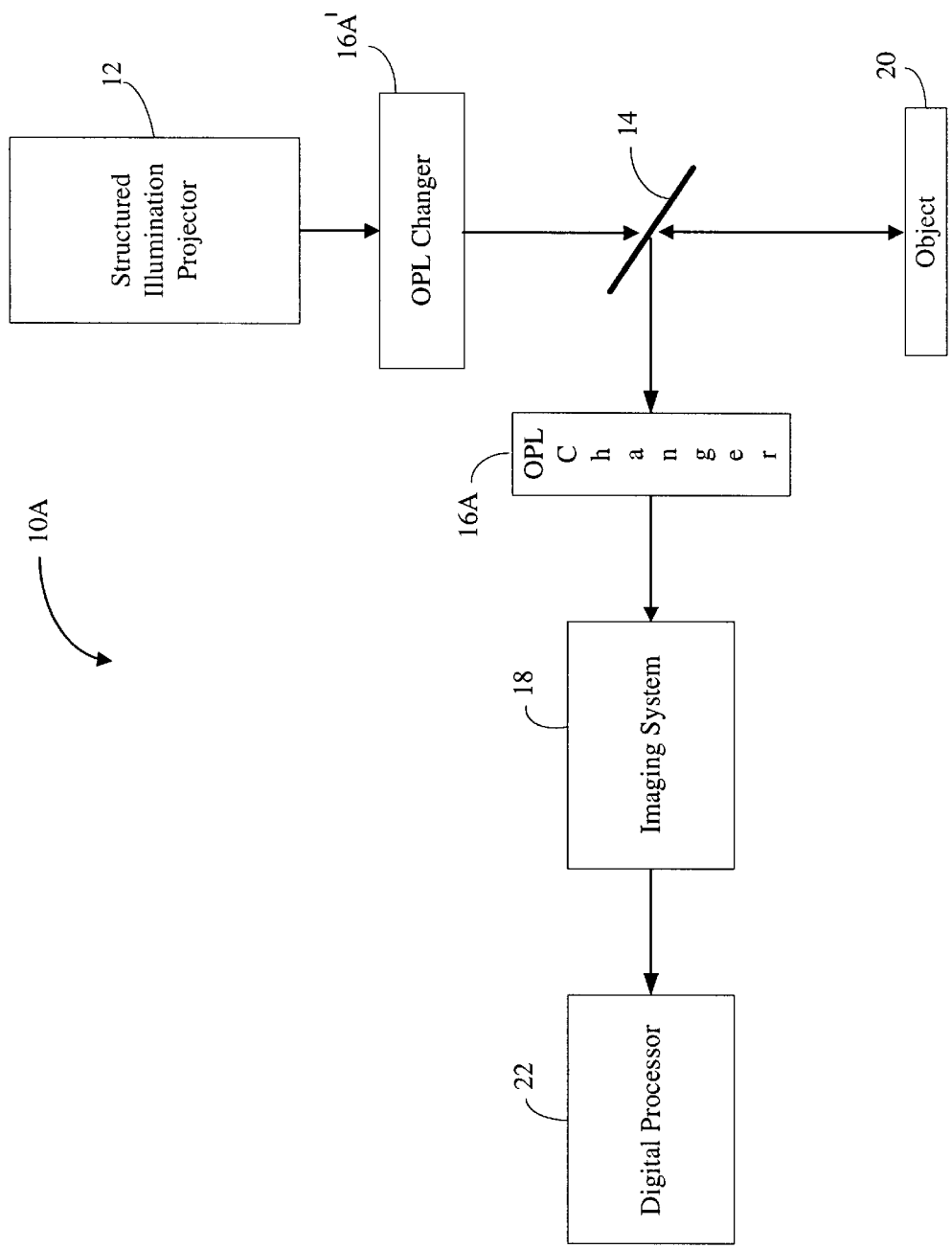
FIG. 1A is a schematic view of a system configuration of a depth from defocus range sensor having an optical path length changer in the optical path of both the structured illumination projector and the imaging system.
Figure 1B:
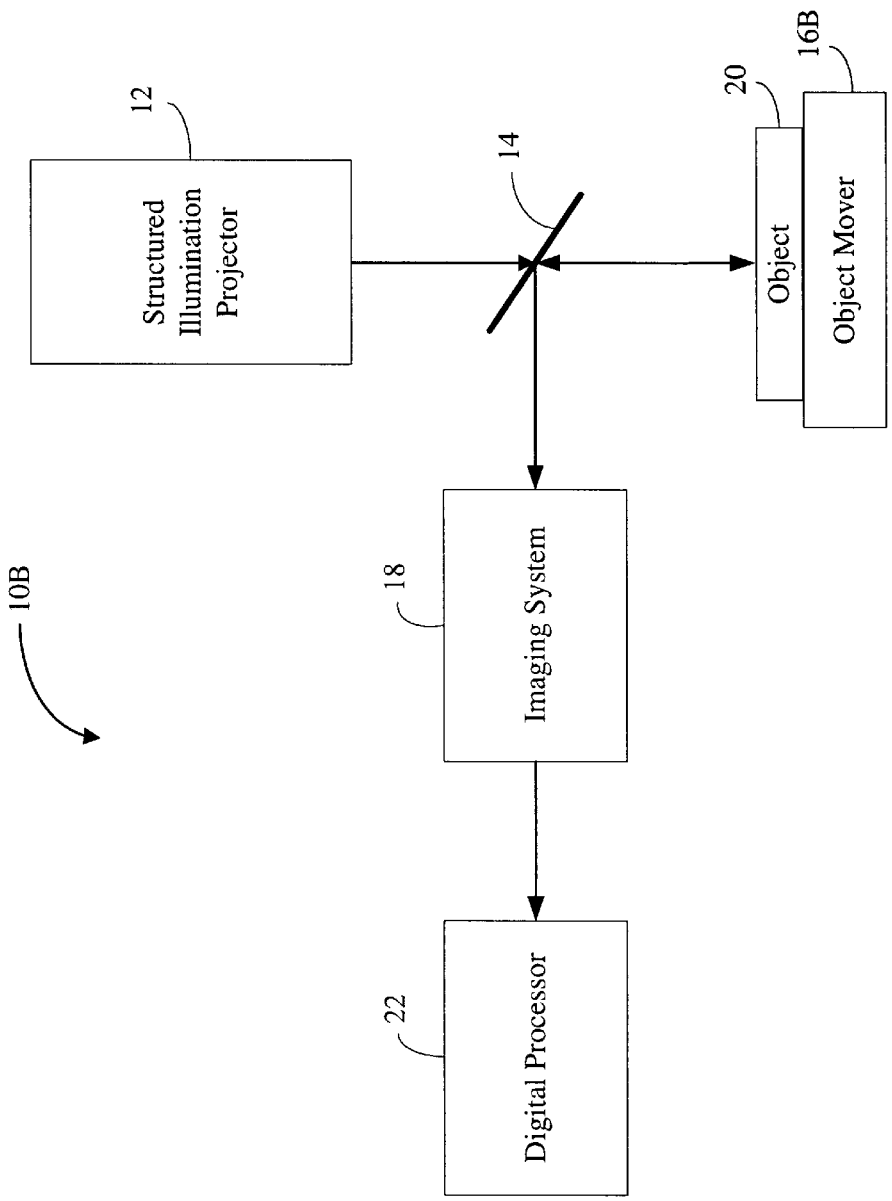
FIG. 1B is a schematic view of a system configuration of a depth from defocus range sensor having an object mover to change the optical path length to the object.

The focal distance changing means 16 is shown in FIG. 1 located in the common illumination and imaging path, although many different configurations are possible, two of these being shown in FIGS. 1A and 1B. For example, it is possible to change optical path length and thereby change focal distance at the camera of the imaging system 18 and mask of the structured illumination projector 12 using respective optical path length changers 16A and 16A' or at the camera of the imaging system 18 alone using the optical path length changer 16A.

Figure 2:
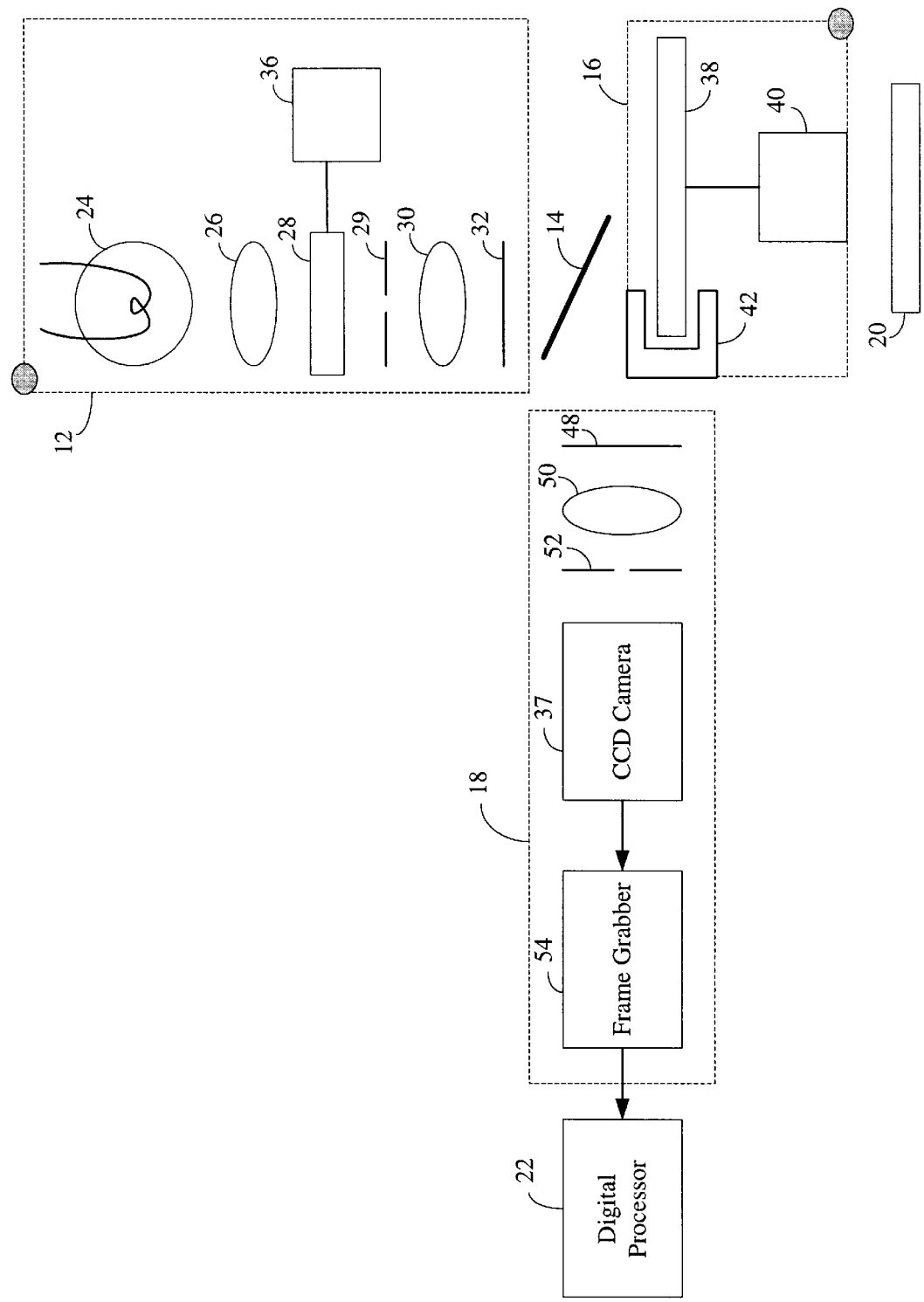
FIG. 2 is a schematic view of a preferred embodiment of the system configuration of FIG. 1.

In a preferred embodiment, the optical path length changers can include a rotatable wheel with a plurality of sectors, such as shown in FIG. 2, each sector including a transparent material having a different thickness, and/or different index of refraction, so as to provide a different optical path length for each section. Another embodiment includes a tiltable pane of glass, for example, wherein the path length of a ray of light though the pane is increased or decreased by tilting the pane.

In a preferred embodiment, optical elements of the optical path length changers 16, 16A, and 16A' are coated with an anti-reflective coating.

In operation, images are obtained of the object 20 at two focus positions, permitting the calculation of absolute range between these positions, as detailed later. The imaging system 18 captures digital electronic images of the object 20 under structured illumination. Images so obtained are analyzed by the processor 22 to produce a range image, as detailed in FIG. 10.

Figure 3:
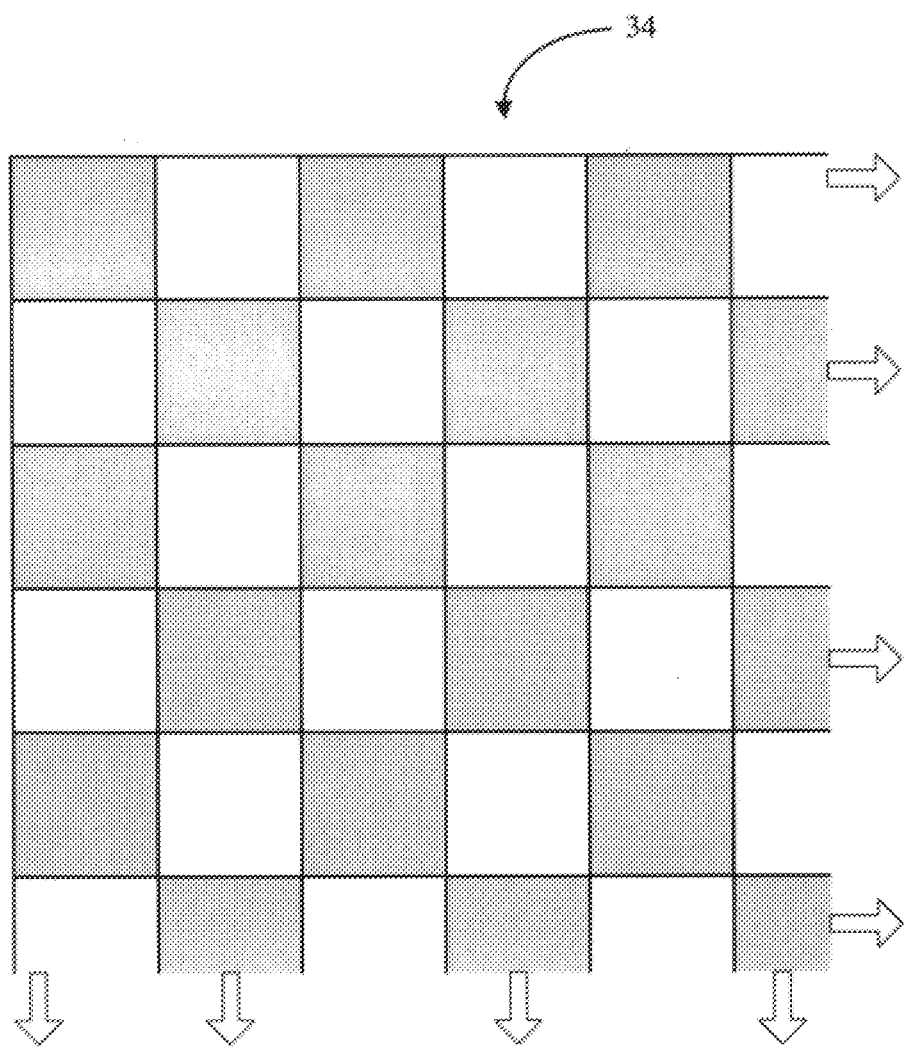
FIG. 3 is a top view of a checkerboard mask pattern of the mask of FIG. 2.

FIG. 2 is a preferred embodiment of the depth from defocus sensor 10 using object texture removal by albedo normalization. In FIG. 2, the structured illumination projector 12 consists of a bright light source 24, collimating optics 26 to efficiently gather light from the source 24, a patterned mask 28, a projection lens 30, and a polarizer 32. The projector 12 focuses a bright image of the mask 28 onto the object 20 to impose a pattern of known spatial frequency upon the surface of the object 20. This pattern serves as artificial object texture or other object feature for the purpose of determining an exact measure of defocus. FIG. 3 shows a detailed view of a mask 34 having a periodic pattern, such as a two-dimensional periodic "checkerboard" pattern, appropriate for use in projector 12 of the sensor 10. Preferably, the mask 34 is fabricated from a glass plate having a chrome pattern by the same photolithographic process that is used to make masks employed in integrated circuit manufacturing.

Referring again to FIG. 2, the mask is mounted on a flexure mechanism including hard motion stops, permitting movement along one axis, as described in co-pending U.S. patent application Ser. No. 08/777,107. A piezo-electric element 36 is in contact with the mask 28. When energized, the piezo electric element 36 moves the mask 28 one half of the illumination period of the mask 28, as determined by the location of a hard motion stop (not shown). The provision of two mask positions separated by one half of the illumination period permits reconstruction of a reflectance image, as described in co-pending U.S. patent application Ser. No. 08/777,107. The mask pattern size is preferably chosen to equal exactly the size of four photosensitive elements (pixels) in the camera 37 of the imaging system 18. Using four pixels per mask period creates the condition that each pixel differs by 90 degrees of mask phase, which permits evaluation of contrast in the acquired images without requiring precise (sub-pixel) alignment between mask 28 and camera 37, as described below in conjunction with FIG. 10. Making the mask scale correspond to sensor scale permits use of the same lens configuration 30 and 50 for both projection 12 and imaging 18 components of the system 10.

Also in FIG. 2 is a beam splitter 14, preferably a plate type beam splitter, and an optical path length changer 16 for changing system focal distance. For example, the optical path length changer 16 can include a sector wheel 36 of glass plates rotated by a motor 40, and an optical interrupter 42, or other feedback means, for synchronizing image acquisition with rotation of the sector wheel 36, each glass plate providing a different optical path length. The beam splitter 14 permits coaxial projection and imaging.

Figure 4:
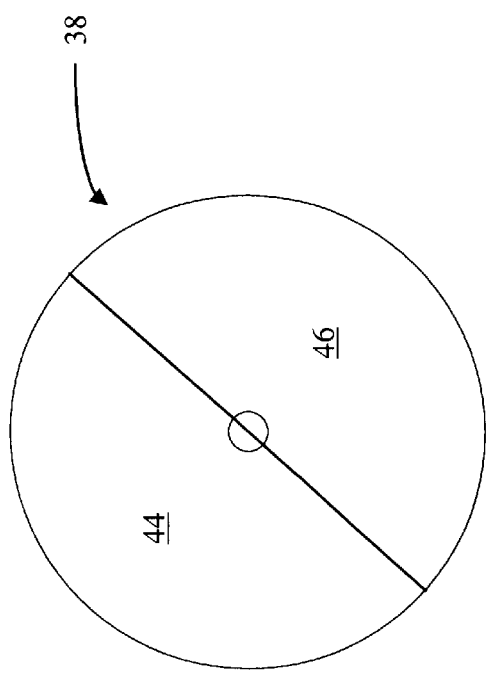
FIG. 4 is a top view of a sector wheel of FIG. 2 having two sectors.

FIG. 4 shows the sector wheel 38, consisting of two semi-circular glass plates 44 and 46 cemented together, each semi-circular glass plate 44, 46 being made of a glass with a different respective index of refraction, $n_1$ and $n_2$. It is well known that the optical path length, L, of light traveling through a transparent media is given by L=nx, where x is distance through the medium (i.e., thickness of the plate), and n is the index of refraction of the medium. By choosing a plurality of plates with different indices of refraction and/or thicknesses, it is possible to change the optical path length by changing the plate through which the rays of the object image are transmitted, thereby changing the focal distance of the imaging system.

The wheel 38 having plates 44, 46 is mounted on a motor 40, so that rotation of the wheel 38 periodically changes system focus between two known planes. The optical interrupter 42, or other feedback means, is used to synchronize image acquisition with sector wheel rotation, so that images at two distinct focal positions are alternately obtained.

The imaging system 18 of the preferred embodiment is shown in FIG. 2 as including a polarizer 48, a lens 50, a stop 52, a CCD camera 37, and a frame grabber 54. The polarizer 48 in the imaging path works in conjunction with the polarizer 32 in the illumination projector 12 to reduce the system dynamic range needed to accommodate specular reflection at the object 20. This arrangement of crossed polarizers, known in the art as a polarizer/analyzer, eliminates most of the specular component of reflected light, permitting the diffuse component to pass. The polarizer/analyzer is not completely efficient. The remaining component of specular light can be used to contribute to the depth from defocus signal if the correct optical settings are used, as described in co-pending U.S. patent application Ser. No. 08/777,106, filed Dec. 31, 1996, entitled "Depth from Defocus Optical Apparatus with Invariance to Surface Reflectance Properties". If desired, the relative orientation of the polarizers 32 and 48 can be adjusted to pass more than the minimum amount of the specular light. This can be useful when the object of interest produces mostly specular reflection, such that structured illumination contrast is otherwise very low.

Still referring to FIG. 2, the projection lens 30 and the imaging lens 50 are shown with apertures 29 and 52 each located near the side of the respective lens that is farther away from the object. The location and size of these apertures is important for obtaining uniform response on both specular and diffuse reflection, as explained in co-pending U.S. patent application Ser. No. 08/777,106, filed Dec. 31, 1996. Also, the location and size of the apertures is important in setting range sensitivity, and in obtaining telecentric operation, as will now be described.

Figure 5:
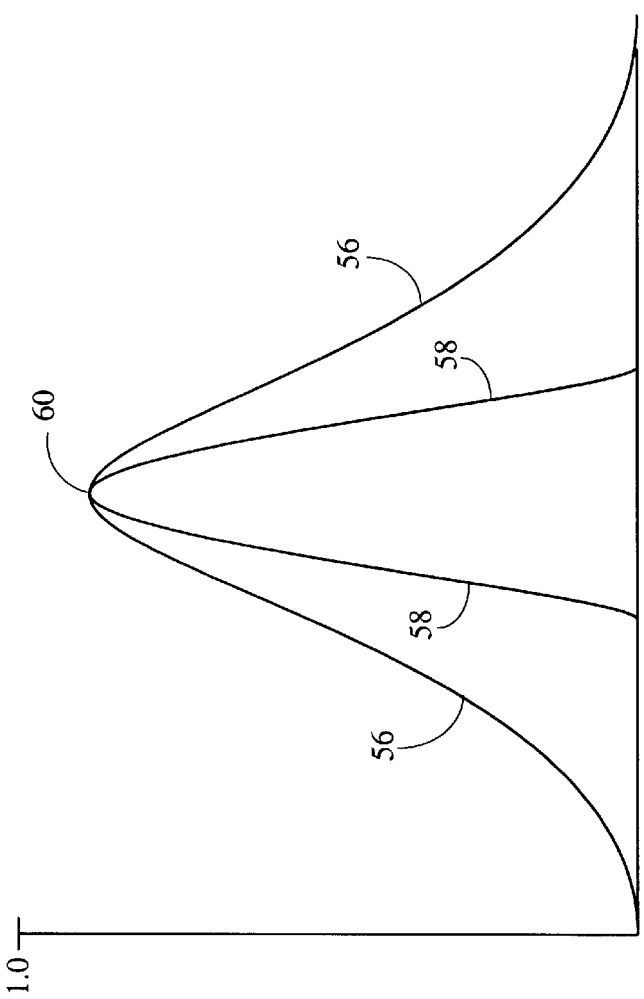
FIG. 5 is a graph of the through-focus modulation transfer function curves of a lens at two different aperture settings.

FIG. 5 shows two through-focus modulation transfer function curves 56 and 58 of a lens for each of two different aperture settings. Here, the horizontal axis represents focus shift (displacement of the object from the focal plane) in millimeters, and the vertical axis represents a dimensionless contrast ratio. Such curves 56 and 58 are commonly used to show the contrast at different focal positions with respect to a particular lens obtained when imaging an object, where the object image is characterized by a single spatial frequency. From the curves 56 and 58, it can be seen that the lens will image a single spatial frequency, such as the spatial frequency of the projected structured illumination pattern of the present invention, with contrast proportional to distance from peak focus, i.e., the peak 60 of the curves. It is this characteristic of the lens which forms the basis of range measurement by defocus. FIG. 5 also shows that the depth of field of a lens is inversely proportional to the aperture size of the lens stop. Thus, the aperture setting contributes to determining the range sensitivity obtained.

Each aperture stop location shown in FIG. 2 has been placed at the lens exit pupil location to make the lenses 30 and 50 telecentric in object space. The telecentric condition ensures that a ray of light from any scene point which passes through the aperture emerges parallel to the optical axis on the image side of the lens. With this arrangement, system magnification does not change with object-to-lens distance (range) in the preferred embodiment. It is possible to construct depth from defocus sensors without using the telecentric arrangement, but this results in both range and field dependent distortion of (x,y) coordinates in the obtained depth (range) images, and also creates correspondence errors when images taken at different focal positions are combined in processing.

The CCD camera 37 shown in FIG. 2 preferably has high dynamic range and low noise. For example, the Dalsa CA-D4-1024T is suitable, having an internal analog to digital converter (digitizer) for low noise and 12-bit gray scale output. The high dynamic range is preferable because the raw gray scale images obtained contain both object reflectance information and the structured illumination component, modulated by lens defocus as a function of range, which component carries the desired range signal. The frame grabber 54 can be any one of many models capable of connecting the CCD camera 37 to the digital image processor 22, which is preferably a personal computer.

Many different embodiments of the optical, mechanical, and electro-optical sub-systems and elements of the system of the invention are possible without departing from the spirit and scope of the invention. For example, FIG. 6 shows a system 62 employing a single lens 64 for both projection of structured illumination and for performing imaging.

Figure 6:
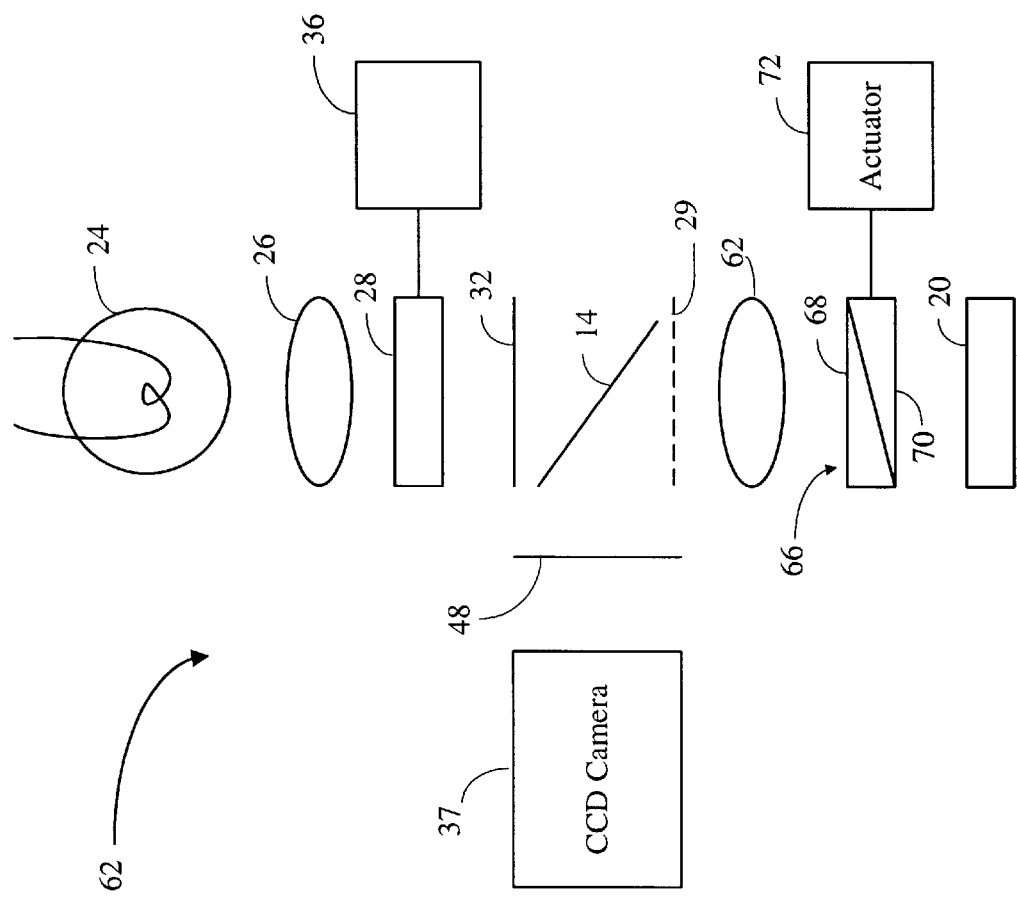
FIG. 6 is a schematic view of a system employing a single lens for both projection of structured illumination and the image system.

Also shown in FIG. 6 is yet another element for changing optical path length 66 so as to change system focal distance. The element 66 includes a pair of opposing glass wedges 68 and 70. One wedge 70 is driven back and forth by a linear actuator 72 with the wedges 68 and 70 remaining in contact. This arrangement provides a variable thickness glass assembly which modifies the optical path length L generally along the direction of the optical axis according to L=nx, where x is the combined thickness of the wedges that varies as a function of the position of the linear actuator 72 as the hypotenuse portions of the wedges 68 and 70 slide over each other. It is also possible to simply move the object 20 between two discrete positions, such as by using an object mover 16B, to obtain the needed focal displacement, as shown in FIG. 1B.

Figure 7:
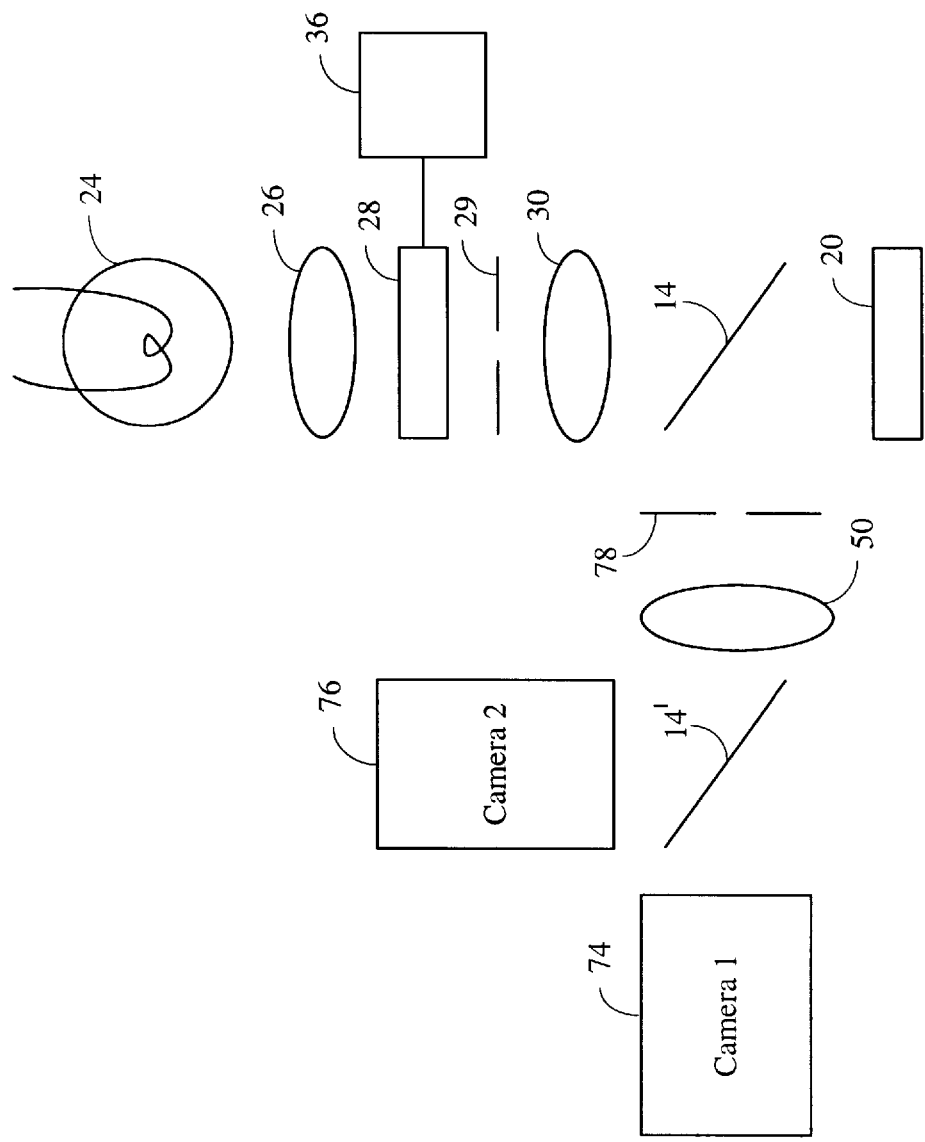
FIG. 7 is a schematic view of a system employing two cameras located at different focal distances from the imaging lens.

FIG. 7 shows another embodiment of the invention using two cameras 74 and 76 located at different focal distances from the imaging lens 50. A beam splitter 14' has been added to relay an image of the object 20 to both cameras 74 and 76. In the configuration of FIG. 7, no active focal distance switching, i.e., active changing of the optical path length, is required. Rather, images at two different focus positions are obtained simultaneously and respectively from the two cameras 74 and 76. Also note that the telecentric position of the aperture stop 78 nearest to the imaging lens 50 has been switched to the entrance pupil location, so that image side telecentricity is obtained. Image side telecentricity ensures that image pairs obtained respectively from the two cameras are taken with equal magnification and thereby ensuring maintenance of spatial correspondence between the two images of each image pair.

Figure 8:
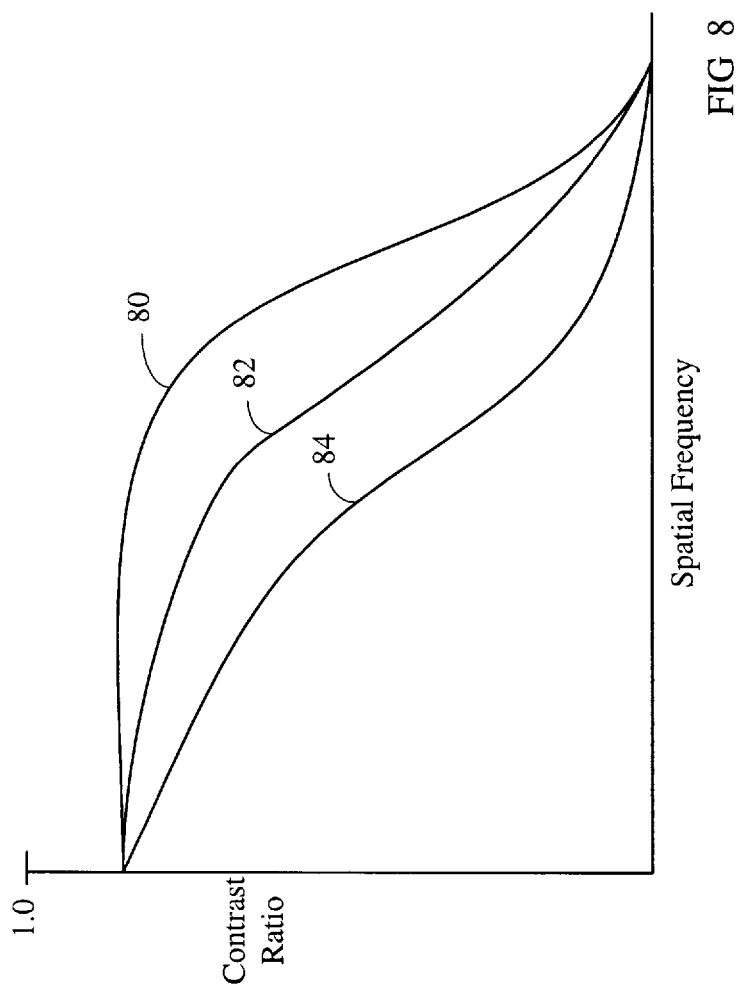
FIG. 8 is a modulation transfer function (MTF) plot of a lens at three different focal distances.

The practical use of the depth from defocus technique depends on the solution of the problem caused by the naturally occurring spatial frequency content of images of most objects. The Fourier transform of images of objects showing surface structure (textured objects) reveals that such images are composed of many different spatial frequency components. The different frequency components are not equally blurred by defocus of imaging optics. FIG. 8 shows three MTF (Modulation Transfer Function) curves 80, 82, 84 of a lens at three different focal distances, where the vertical axis represents contrast ratio, and the horizontal axis represents spatial frequency. Plotting contrast obtained by the lens against spatial frequency is a standard measure of lens performance. From inspection of each curve 80, 82, 84 in the figure, it is clear that the lens acts as a low-pass filter. It is also clear that the low pass filter function changes with extent of defocus. High frequency components are lost at a different rate than low frequency components as the lens is further defocused. For a particular measured level of contrast, it is therefore apparent that one cannot uniquely determine the degree of defocus without knowing the exact spatial frequency content of the scene. Since we use the degree of defocus to measure range, it is recognized by the invention that range cannot be uniquely measured for different objects without controlling the spatial frequency content of the object being viewed.

The use of active illumination in this invention provides a way to impose upon an object an artificial texture of precisely know spatial frequency. For objects otherwise devoid of reflectance texture, this provides a complete solution to the problem of obtaining a unique measure of degree of defocus from observed contrast. However, most objects do not have uniform reflectance. One solution to this problems is to bandwidth-limit the measure of contrast. This improves the system signal-to-noise ratio by eliminating the response to frequencies far from the frequency of the texture superimposed by the illuminator. This method is incorporated in the present invention, as described below. However, natural object texture frequency components close to the structured illuminator frequency cannot be rejected without undue loss of spatial resolution. These components have unknown phase and amplitude, and can exceed the superimposed texture in amplitude on many objects of interest. This results in unreliable and noisy range images.

When a camera observes a scene, the observed brightness or radiance, L is a function of the amount of light falling on the scene, or irradiance, E. If the illumination angle is constant and normal to the surface, radiance is simply the product of a reflectance factor or albedo, $\rho$ and irradiance (B. K. P. Horn, *Robot Vision*. MIT Press, 1986, pp. 22–23, 230): E=L$\rho$. The natural object reflectance texture mentioned above will hereafter be referred to simply as the object albedo. It is an aim of this invention to remove the effect of object albedo from the measurement of depth by focal gradient analysis, including depth from defocus and depth from focus.

Thus, it is a goal of the invention to make the image of the object show only the illumination structure and its local degree of defocus. According to the invention, this can be done by normalizing for the object albedo in the observed radiance, to obtain the structured irradiance and its defocus only.

Figure 9:
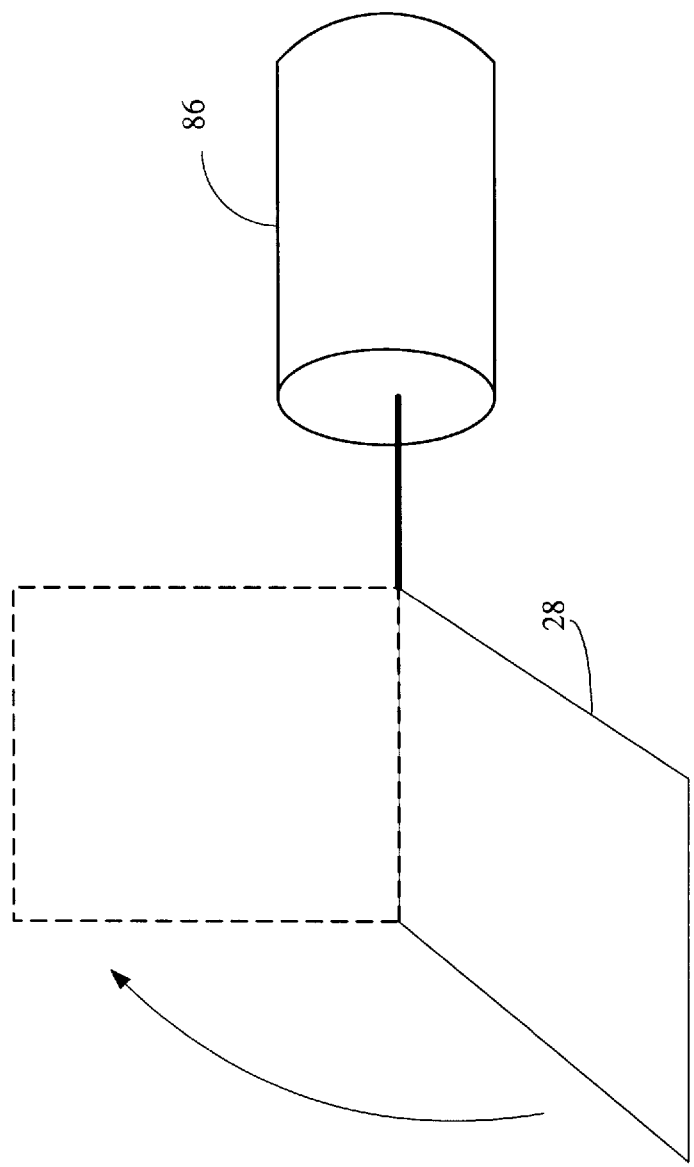
FIG. 9 is a side view of a device for moving the mask of the structured illuminator out of the optical path of the illuminator.

FIG. 9 shows a preferred apparatus for moving the mask 28 of the structured illuminator 12 of FIG. 1 out of the optical path of the illuminator 12 by swinging the mask 28 out of the optical path using a motor 86. An image, $I_\rho$, is acquired using the apparatus of FIG. 1, but with the mask 28 swung out of the illuminator path. $I_\rho$ is an albedo (reflectance) image of the object. A second image, $I_{\rho E}$, is taken with the mask in its normal position, i.e., in the illuminator optical path. From the radiance equation above, $I_{\rho E}$ contains the product of the albedo and the structured irradiance (illumination). Then, according to the invention, a third image, $I_E$, containing only the illumination structure is obtained by the normalization:

$$PE(x,y) = P\rho E(x,y)/P\rho(x,y) \qquad \text{Equation 1}$$

where pixels P lie in images I. The image $I_E$ has a range of 0 to 1, and is said to be "albedo normalized". Sixteen-bit integer precision is sufficient to carry the range information after normalization, so each point in the albedo normalized image $I_E$ is multiplied by 65,535, for example, in order to fit the albedo normalized image pixels into compact integer precision numbers.

The albedo normalized image $I_E$ shows only the illuminator structure and its defocus. Thus, natural object reflectance texture is removed from the image. Filters used in subsequent processing to measure the degree of defocus may be simplified, since the spatial frequency of the illumination structure is known, and no interfering image components are present. The contrast of the structured illumination component is a direct measure of degree of defocus, from which we compute range.

The albedo normalization step requires that enough dynamic range be present in the camera to represent contrast in the structured illumination even when superimposed on very low albedo (black) objects. Notwithstanding this limitation, the albedo normalization step effects a major reduction in range image noise produced by object albedo.

Other methods can be used to obtain the reference albedo-only image, without changing the way in which the albedo normalization calculation is performed. Preferably, the albedo-only image can be reconstructed from a second periodic illumination object image taken with the structured illuminator pattern shifted 180 degrees of illuminator phase. The two structured illumination object images are digitally acquired, then summed, thereby canceling the mask pattern in the image, as described in co-pending U.S. patent application Ser. No. 081777,107, filed Dec. 31, 1996, to provide a uniform illumination reflectance image. The albedo normalization is then performed by dividing one of the structured illumination images by the uniform illumination reflectance image, as before. This method has the advantage that both the structured illumination image and the uniform illumination reflectance image are acquired with identical light levels. Thus, the DC component of the signal, due to the average illuminator brightness, is also removed.

Alternatively, a structured illuminator mask can be used consisting of clear apertures in a colored filter, such as a red filter. When viewed through a second (solid) red filter, the structure of the resulting illumination will not be visible. Images can be taken with and without the second filter in place to obtain the uniform illumination and structured illumination conditions. Instead of removing and reinserting a filter, two cameras, one with and one without the extra filter, could be used to simultaneously capture both structured illumination and uniform illumination images. Alternately, a color camera may be used, where the red image, for example, represents object albedo, and the green and blue images will show illumination structure. Another embodiment uses a CRT or LCD projector as the structured illuminator. Note that the structured component of the illumination can be electronically inserted or removed to obtain the needed illumination conditions. Many other methods may be employed to obtain both structured illumination and uniform illumination reflectance images without limiting the scope of this invention.

Figure 10:
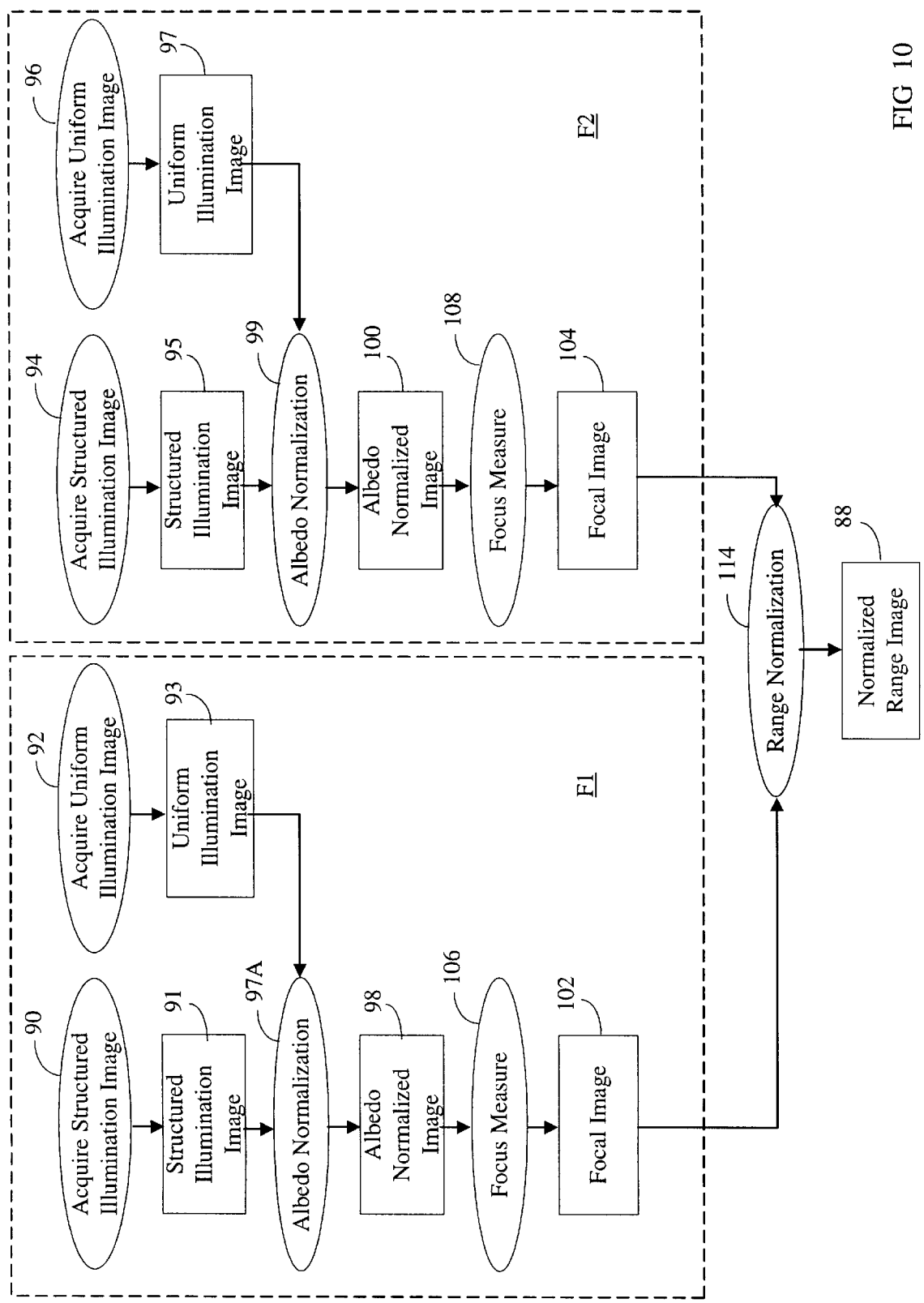
FIG. 10 is a flow chart of the image processing acts for constructing a range image.

FIG. 10 depicts the overall image processing flow used to construct a range image 88 from four images 91, 93, 95, 97 digitally acquired using the apparatus described above. The four raw images 91, 93, 95, 97 consist of a pair of structured illumination images 91, 95, and a pair of uniform illumination images 93, 97, with each member of each pair being taken at one of two different focal positions F1 and F2. Identical processing is performed on the image pairs 90, 93 and 95, 97 producing two focal images 102, 104. These focal images 102, 104 are then used to produce a normalized range image 88.

The sequence of operations used to produce each focal image 102, 104 will now be described, this sequence being the same for each focal image 102, 104. First, an image acquired under structured illumination 91, 95 is albedo normalized 97A, 99 using an albedo (uniform illumination, reflectance-only) image 93, 97 to provide an albedo-normalized image 98, 100 according to the methods described above. A focal image 102, 104 is then constructed from this albedo-normalized image 98, 100 of structured illumination, by processing the image 98, 100 using a focus measure 106, 108.

The focus measure 106, 108 is most simply described as an operation which measures contrast in the albedo-normalized image 98, 100 of structured illumination. For example, an elementary focus measure consists of a root mean square (RMS) operation on a small neighborhood corresponding to the structured illumination period. In one such embodiment, the RMS value of a four by four (sixteen pixel) neighborhood is computed, corresponding to a four pixel sampling at the camera of each dimension of the structured illumination period of the mask of FIG. 3:

$$F_{(x,y)} = SQRT(\Sigma_{j=y-1}^{y+2}(\Sigma_{i=x-1}^{x+2} P^2_{(i,j)})) \qquad \text{Equation 2}$$

where SQRT( ) performs a square root operation. One period equals one white square and one black square in FIG. 3. The RMS operation is well known to respond to average signal amplitude without respect to phase when used in conjunction with such quadrature sampling. In this case, albedo normalization has removed the DC offset of the images obtained under structured illumination. It is therefore possible to convert the albedo normalized image 98, 100 to signed format by subtracting a fixed offset corresponding to half of the range; this offset equals 32,768 for the sixteen-bit integer image representation previously described. Contrast in this signed image is measurable as the bipolar signal excursion around zero. The four-by-four RMS neighborhood operation is obtained using Equation 2. The resulting focal image 102, 104 has pixel values which are proportional to the amplitude of the structured component of illumination, which is in turn proportional to degree of focus.

Figure 11A:
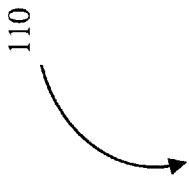
FIG. 11A is a filter kernal for convolution with an albedo normalized image to produce a focal image.
Figure 11C:
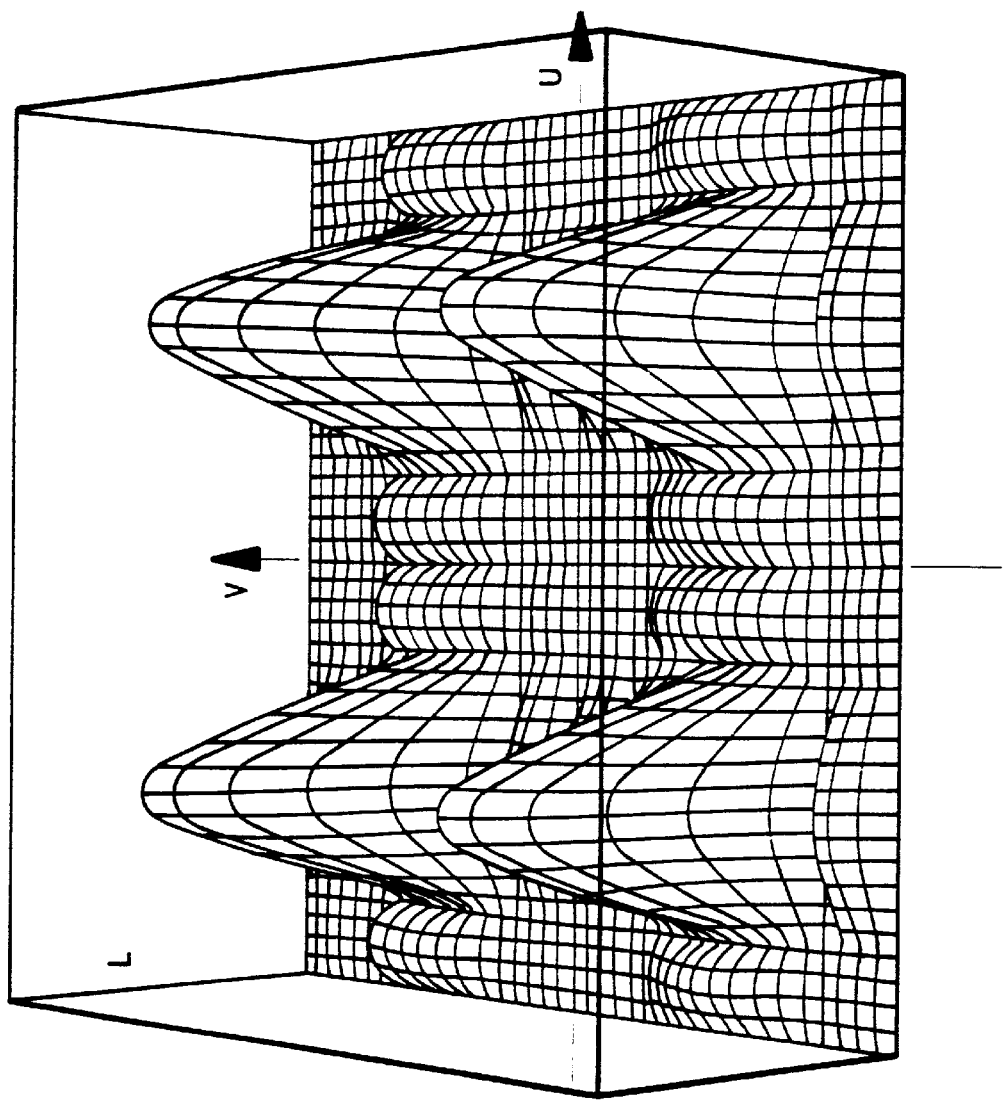
FIG. 11C is a plot of the Fourier transform of the kernal of FIG. 11A.

The above-described focus measure 106, 108 responds to a broad band of spatial frequencies. Improved signal-to-noise ratio is obtained through the well known technique of bandpass limiting. In this case we wish to respond to the frequency band surrounding the structured illumination frequency only. The investigators M. Watanabe, S. K. Nayar, and M. Noguchi, in their paper "Real-Time Implementation of Depth from Defocus," Proc. SPIE Conf., Philadelphia, Pa, October 1995, herein incorporated by reference, have described a tuned focus measure based on his principle. Their kernel 110 shown in FIG. 11A uses the general form of the well-known Laplacian operator, but substitutes modified coefficients to obtain a peaked frequency response. FIG. 11C shows the response of the kernal 110 in FIG. 11A. In a preferred embodiment, the filter kernel 110 of FIG. 11A is convolved with the albedo normalized image 98, 100 to produce a focal image 102, 104. Convolution by this kernel 110 combines a filtering operation with a local differencing operation to produce a focal image 102, 104 as a measure of illuminator contrast.

In order to avoid phase sensitivity in the alignment between the illuminator mask 28 and the physical CCD pixels of the CCD camera 37, we again employ the technique of quadrature sampling of the illumination period by the CCD. That is, four CCD pixels are used to image exactly one period of structured illumination. The kernel 110 of FIG. 11a is modified from a four-by-four to a seven-by-seven configuration 112 in FIG. 11b by inserting rows and columns of zeros. This operator is most sensitive to image components with a four-pixel period. The signed output of the convolution of the albedo normalized image 98, 100 and the kernel 112 is combined over a two-by-two neighborhood using an RMS operation to obtain a phase invariant bandpass-filtered focus measure. In this case, the RMS is used to compute the phase independent magnitude of the focus measure obtained by the modified Laplacian.

Each pixel in the focal image 102, 104 obtained by the processing thus far described in FIG. 10 represents the local degree of focus of the structured illumination at the object 20. This measure of focus is independent of object albedo to the extent that camera dynamic range can faithfully represent contrast of structured illumination viewed at the object surface. If the object 20 is translated in height with respect to the depth from defocus sensor, each point on the object will produce a corresponding set of points in the obtained focal images which traces out the lens focus function of FIG. 5. It is thus apparent that the focal image 102, 104 is a relative measure of range, and therefore can be calibrated in accordance with a particular application to serve as a direct measure of range. This depth from defocus at a single focal position is possible only because we have normalized out albedo-induced contrast changes in the images.

To calibrate, run the object through focus using a z-positioning stage. For each known z position, store the position and the focus measure computed for a small patch on the object. The collected through focus data is termed the raw transfer (xfer) function. Build a look-up table (LUT) to get linear Z from the transfer function. We have the transfer function by Z in the form of our calibration data. Thus, the LUT must be inverted. This is done by traversing the xfer data so that the Z LUT address (transfer function) is bracketed by two raw transfer function values. Z values are then interpolated while staying inside of the xfer interval. The interpolation treats the interval as a line segment. The slope of each new raw transfer function interval is found as y1−y0/x1−x0, where the y values are raw transfer function, and the x delta is the z step size used in obtaining the raw data. The slope is used to interpolate a value by $$xi = x0 + (yi - y0)/m$$

where xi,yi is the z value interpolated at the desired table index (integer transfer function value). Note that (x,y) here do not relate to instrument measurement space: x is the independent variable, i.e., range (actual z), and y is the dependent variable, i.e., transfer function (raw z).

The use of defocus information from a single focal position to find range is, however, limited by material dependencies on non-homogeneous objects. For example, contrast is degraded by translucency at the surface of an object, due to scattering of light internal to the object and re-emergence at the surface. This causes, for example, white paper to display much lower contrast than white paint. Due to these effects, it is necessary to apply a local material-dependent response factor when measuring materials of mixed composition. This process, referred to herein as "range normalization", is represented by block 114 in FIG. 10.

FIG. 2, described above, shows a sector wheel 38 arranged so that images can be acquired at two distinct focal positions. In other words, the position of best focus of the lens 50 is displaced with respect to the object 20.

Figure 12:
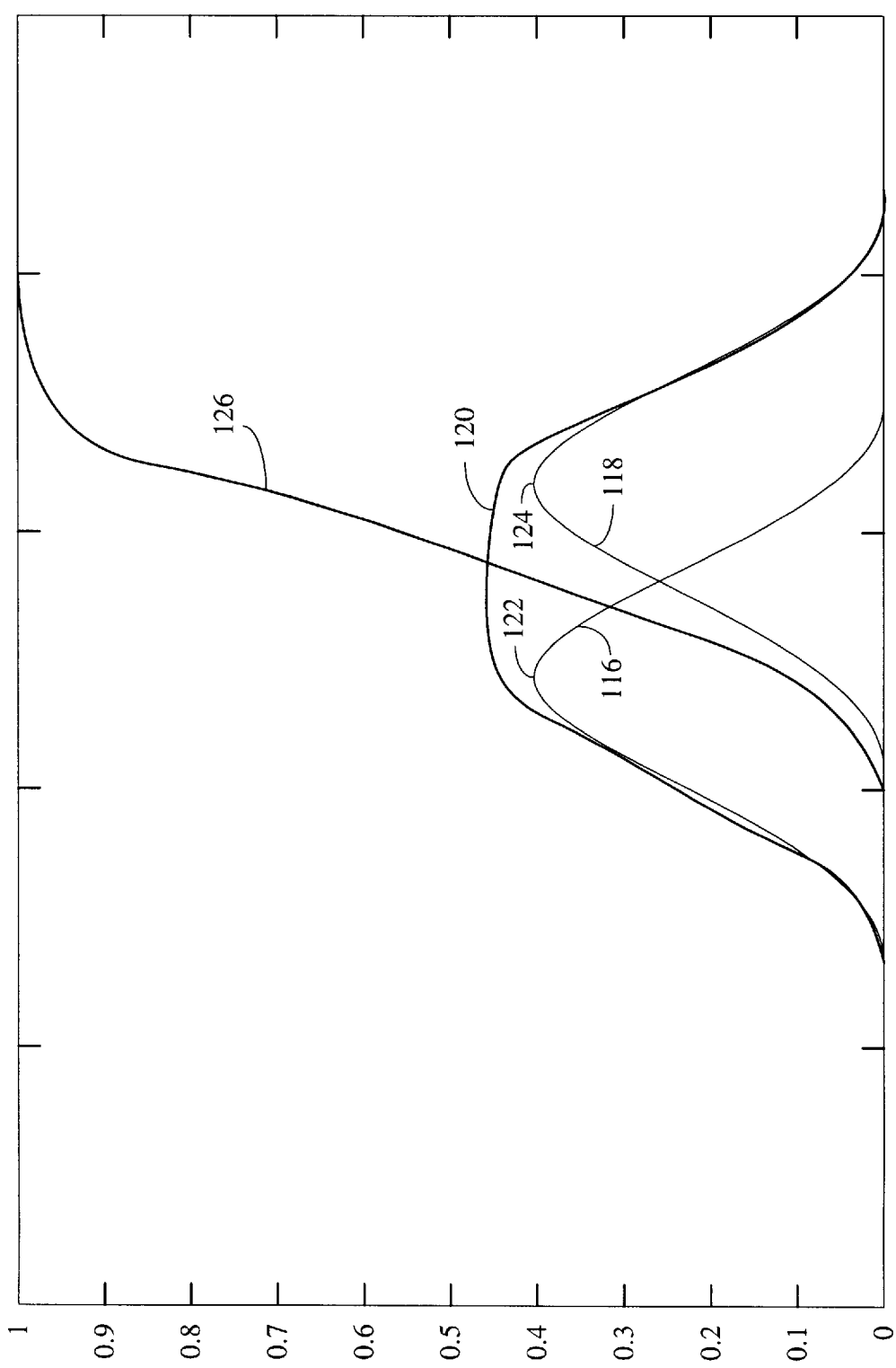
FIG. 12 is a plot of two Gaussian focus curves, their sum for use in range normalization, and the range normalized system response using the sum of the two Gaussian curves.

FIG. 12 represents the lens focus function for each of the two focal positions using Gaussian curves 116, 118. These curves 116, 118 approximate the "through focus" modulation transfer function (MTF) curves of a real lens, as discussed earlier in conjunction with FIG. 5. Thus, these curves 116, 118 also approximate the focus measure response to structured illumination with defocus, at the two different focal positions (near and far) produced by the sector wheel 38.

Also shown in FIG. 12 is the response to the sum 120 of the two approximate focus curves 116, 118. The standard deviation of each of the plotted Gaussians 116, 118 is sigma, and the displacement between Gaussians 116, 118 is chosen to be two sigmas. This two-sigma separation of focal peaks 122, 124 produces a response for the sum of focus curves 120 which is almost constant in the region between the focal peaks 122, 124. In this region, the magnitude of the sum of focus curves 120 is mainly dependent on the surface reflectance properties of the object under structured illumination, and not dependent on range. In other words, the sum of focus measures 120 responds to local material-dependent projected contrast properties, and does not respond to focal distance. Thus, the sum of focus measures 120 can be used to normalize the response of either focus measure 116, 118 for material independence.

For a given optical system and set of optical parameters (mainly stop settings), we can measure the focal curve width, e.g., of focal curves 116, 118, and then set focal separation (by choosing the materials and thicknesses in the sector wheel, for example) so that the two sigma separation criterion is met. Normalized range is then computed as:

$$R_{(x,y)} = F1_{(x,y)} / F1_{(x,y)} + F2_{(x,y)} \qquad \text{Equation 3}$$

where F1 is a point in the focal image for the near focal plane, and F2 is the corresponding point in the far focal plane. This normalization produces values of relative range 0<R<1. The result is scaled to 8-bit integer values by multiplying by 255. To get absolute range, a calibration can be performed as described for obtaining absolute range information from a single focal image, as described above.

FIG. 12 shows the resulting transfer function R 126 with respect to focal position. The function 126 approximates linearity around its midpoint. The full sensor range between the focal peaks 122, 124 can be used with empirical calibration of the sensor.

This invention is not limited to depth from defocus using one or two focal positions. Note that extra focal positions can be obtained, for example, by using more than two sectors in the wheel 38 of FIG. 2. Sensor range can then be extended by combining the ranges so obtained.

Other modifications and implementations will occur to those skilled in the art without departing from the spirit and the scope of the invention as claimed. Accordingly, the above description is not intended to limit the invention except as indicated in the following claims.

What is claimed is:

1. A method for providing a range image of an object, the method comprising the acts of:

acquiring a structured illumination image of the object;

acquiring a uniform illumination image of the object;

performing albedo normalization using the structured illumination image of the object and the uniform illumination image of the object to provide an albedo-normalized image;

processing the albedo-normalized image using a focus measure to provide a focal image;

using the focal image to provide a range image.

2. The method of claim 1, wherein the act of processing the albedo-normalized image using a focus measure to provide a focal image includes the act of using an RMS operation.

3. The method of claim 1, wherein the act of processing the albedo-normalized image using a focus measure to provide a focal image includes the act of using a Laplacian-like convolution.

4. The method of claim 1, wherein the act of using the focal image to provide a range image includes the act of using a table look-up calibration employing a look-up table.

5. The method of claim 4, wherein the act of using a table look-up calibration includes the acts of:

collecting focus measure data at known Z-positions; and inverting a look-up table using interpolation.

6. The method of claim 1, wherein the act of performing albedo normalization is achieved by dividing the structured illumination image of the object by the uniform illumination image of the object.

7. Apparatus for providing a range image of an object, the apparatus comprising:

structured illumination image acquisition means for acquiring a structured illumination image of the object;

uniform illumination image acquisition means for acquiring a uniform illumination image of the object;

albedo-normalization means, connected to the structured illumination image acquisition means and the uniform illumination image acquisition means, for using the structured illumination image of the object and the uniform illumination image of the object to provide an albedo-normalized image; and processing means, connected to the albedo-normalization means, for processing the albedo-normalized image using a focus measure to provide a focal image that conveys relative range information.

8. The apparatus of claim 7, wherein the albedo normalization means includes means for dividing the structured illumination image of the object by the uniform illumination image of the object.

9. The apparatus of claim 7, further including calibration means, connected to the processing means, for using the focal image to provide an absolute range image.

10. Apparatus for providing a range image of an object, the apparatus comprising:

a structured illumination image acquirer that provides a structured illumination image of the object;

a uniform illumination image acquirer that provides a uniform illumination image of the object;

an albedo-normalizer, connected to the structured illumination image acquirer and the uniform illumination image acquirer, capable of using the structured illumination image of the object and the uniform illumination image of the object to provide an albedo-normalized image; and a focus measure processor, connected to the albedo-normalizer, capable of processing the albedo-normalized image using a focus measure to provide a focal image that conveys relative range information.

11. The apparatus of claim 10, wherein the albedo-normalizer includes an image divider that divides the structured illumination image of the object by the uniform illumination image of the object.

12. The apparatus of claim 10, further including a calibration processor, connected to the focus measure processor, capable of using the focal image to provide an absolute range image.

13. A method for providing a range image of an object, the method comprising the acts of:

acquiring a first structured illumination image of the object at a first focal position;

acquiring a first uniform illumination image of the object at the first focal position;

performing albedo normalization using the first structured illumination image of the object and the first uniform illumination image of the object to provide a first albedo-normalized image; processing the first albedo-normalized image using a focus measure to provide a first focal image; and performing range normalization using the first focal image and a second focal image acquired at a second focal position to provide a relative normalized range image.

14. The method of claim 13, further including the act of calibration to obtain an absolute normalized range image from the relative normalized range image.

15. The method of claim 13, wherein the act of processing the first albedo-normalized image using a focus measure to provide a first focal image includes the act of using an RMS operation.

16. The method of claim 13, wherein the act of processing the first albedo-normalized image using a first focus measure to provide a focal image includes the act of using a Laplacian-like convolution.

17. The method of claim 13, wherein the act of performing albedo normalization is achieved by dividing the first structured illumination image of the object by the first uniform illumination image of the object.

18. Apparatus for providing a range image of an object, the apparatus comprising:

first structured illumination image acquisition means for acquiring a first structured illumination image of the object at a first focal position;

first uniform illumination image acquisition means for acquiring a first uniform illumination image of the object at the first focal position;

albedo-normalization means, connected to the first structured illumination image acquisition means and the first uniform illumination image acquisition means, for using the first structured illumination image of the object and the first uniform illumination image of the object to perform albedo normalization so as to provide a first albedo-normalized image;

first processing means, connected to the first albedo-normalization means, for processing the first albedo-normalized image using a focus measure to provide a first focal image;

range normalization means, connected to the first processing means, for performing range normalization using the first focal image and a second focal image at a second focal position to provide a normalized range image.

19. The apparatus of claim 18, wherein said albedo-normalization means includes means for dividing the first structured illumination image of the object by the first uniform illumination image of the object.

20. Apparatus for providing a range image of an object, the apparatus comprising:

a first structured illumination image acquirer that provides a first structured illumination image of the object at a first focal position;

a first uniform illumination image acquirer that provides a first uniform illumination image of the object at the first focal position;

a first albedo-normalizer, connected to the first structured illumination image acquirer and the first uniform illumination image acquirer, capable of using the first structured illumination image of the object and the first uniform illumination image of the object to provide a first albedo-normalized image;

a first focus measure processor, connected to the first albedo-normalizer, capable of processing the first albedo-normalized image using a first focus measure to provide a first focal image;

a range image processor, connected to the focus measure processor, capable of using the first focal image and a second focal image at a second focal position to provide a normalized range image.

21. The apparatus of claim 20, wherein said albedo-normalizer includes an image divider capable of dividing the first structured illumination image of the object by the first uniform illumination image of the object.

* * * * *